US012623489B2

(12) United States Patent
Rimai

(10) Patent No.: US 12,623,489 B2
(45) Date of Patent: May 12, 2026

(54) TIRE BAND WITH FILAMENTS HAVING A NON-CIRCULAR CROSS SECTION

(71) Applicant: Bridgestone Americas Tire Operations, LLC, Nashville, TN (US)

(72) Inventor: Benjamin E. Rimai, Copley, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 407 days.

(21) Appl. No.: 18/038,793

(22) PCT Filed: Dec. 9, 2021

(86) PCT No.: PCT/US2021/072835
§ 371 (c)(1),
(2) Date: May 25, 2023

(87) PCT Pub. No.: WO2022/147398
PCT Pub. Date: Jul. 7, 2022

(65) Prior Publication Data
US 2024/0100882 A1 Mar. 28, 2024

Related U.S. Application Data

(60) Provisional application No. 63/131,387, filed on Dec. 29, 2020.

(51) Int. Cl.
*B60C 7/18* (2006.01)
*B29D 30/02* (2006.01)

(52) U.S. Cl.
CPC ................ *B60C 7/18* (2013.01); *B29D 30/02* (2013.01)

(58) Field of Classification Search
CPC ................................... B60C 7/18; B60C 7/22
See application file for complete search history.

(56) References Cited

U.S. PATENT DOCUMENTS

2008/0314486 A1 12/2008 Manesh et al.
2016/0159152 A1 6/2016 Delfino et al.
(Continued)

FOREIGN PATENT DOCUMENTS

CN 107020886 8/2017
DE 102015218240 3/2017
(Continued)

OTHER PUBLICATIONS

International Search Report and Written Opinion; Corresponding PCT Application Serial No. PCT/US2021/072835 filed Dec. 9, 2021; Authorized Officer Chan Yoon Hwang; Apr. 4, 2022.
(Continued)

*Primary Examiner* — S. Joseph Morano
*Assistant Examiner* — Alex Palmer
(74) *Attorney, Agent, or Firm* — Shaun J. Fox; Bryan J. Jaketic

(57) ABSTRACT

A non-pneumatic tire includes a lower ring having a first diameter and an upper ring having a second diameter greater than the first diameter. The upper ring is substantially coaxial with the lower ring. Support structure connects the lower ring to the upper ring. A circumferential tread is attached to the upper ring. The circumferential tread includes a tread layer and a tread band. The tread band includes a filament assembly that includes a plurality of individual filaments having a non-circular cross section. The filaments are configured and arranged such that the filaments have a packing density of at least 92% within the filament assembly.

19 Claims, 5 Drawing Sheets

(56)        References Cited

U.S. PATENT DOCUMENTS

| 2016/0257170 A1 | 9/2016 | Sugiya et al. |
| 2016/0318342 A1 | 11/2016 | Delfino |
| 2018/0370282 A1 | 12/2018 | Tarutani |
| 2020/0231005 A1 | 7/2020 | Matsuoka et al. |
| 2020/0316998 A1 | 10/2020 | Rhyne et al. |
| 2020/0324576 A1 | 10/2020 | Heo et al. |

FOREIGN PATENT DOCUMENTS

| EP | 0396494 | 11/1990 |
| JP | H10236107 | 9/1998 |
| JP | 2004060128 | 2/2004 |
| JP | 2013129407 | 7/2013 |
| JP | 2014234569 | 12/2014 |
| JP | 2015071846 | 4/2015 |
| JP | 2016531176 | 10/2016 |
| JP | 2017500457 | 1/2017 |
| JP | 2020-175878 A | 10/2020 |
| WO | 2019125460 | 6/2019 |
| WO | 2020139623 | 7/2020 |

OTHER PUBLICATIONS

Supplementary European Search Report; Corresponding EP Application No. 21916586; Oct. 1, 2024.

TIRE BAND WITH FILAMENTS HAVING A NON-CIRCULAR CROSS SECTION

FIELD OF INVENTION

The present disclosure relates to tire bands that include filaments. More particularly, the present disclosure relates to a tire band with filaments having a non-circular cross section.

BACKGROUND

Various tire constructions have been developed that enable a tire to run in an uninflated or underinflated condition. Non-pneumatic tires do not require inflation, while "run flat tires" may continue to operate after being punctured and becoming partially or completely depressurized, for extended periods of time and at relatively high speeds. Non-pneumatic tires may include support structure, such as spokes or webbing, that connects a lower ring to an upper ring. In some non-pneumatic tires, a circumferential tread may be attached to the upper ring of the tire.

The circumferential tread may contain a tread band. The tread band may be a single layer of material or a multi-layer band. Such tread bands may also be referred to as a shear band, a shear element, or a thin annular high strength band element. When used in a non-pneumatic tire, or in a pneumatic tire in a partially pressurized or unpressurized state, the shear element acts as a structural compression member. When used in a fully pressurized pneumatic tire, the shear element acts as a tension member.

SUMMARY OF THE INVENTION

In one embodiment, a non-pneumatic tire includes a lower ring having a first diameter and an upper ring having a second diameter greater than the first diameter. The upper ring is substantially coaxial with the lower ring. Support structure connects the lower ring to the upper ring. A circumferential tread is attached to the upper ring. The circumferential tread includes a tread layer and a tread band. The tread band includes a filament assembly that includes a plurality of individual filaments having a non-circular cross section. The filaments are configured and arranged such that the filaments have a packing density of at least 92% within the filament assembly.

In another embodiment a method of manufacturing a non-pneumatic tire includes providing a lower ring having a first diameter and an upper ring having a second diameter that is greater than the first diameter. The method further includes connecting the lower ring to the upper ring with support structure. The method further includes forming a plurality of individual filaments having a non-circular cross section, and assembling the plurality of individual filaments into a tread band. Furthermore, the method includes applying a tread layer to the tread band to form a circumferential tread, and attaching the circumferential tread to the upper ring.

In yet another embodiment, a non-pneumatic tire includes a lower ring having a first diameter and an upper ring having a second diameter greater than the first diameter. The upper ring is substantially coaxial with the lower ring. Support structure connects the lower ring to the upper ring. A circumferential tread is attached to the upper ring. The circumferential tread includes a tread layer, at least one inextensible layer, and at least one extensible layer. The at least one inextensible layer and the at least one extensible layer are disposed between the tread layer and the upper ring along a radial direction of the non-pneumatic tire. The inextensible layer includes a filament assembly that includes a plurality of individual filaments having a non-circular cross section. A circle circumscribing each of the filaments has a diameter of 0.1-25 mm. Each of the filaments have a coating with a thickness of 0-10 mm.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Circumferential" and "circumferentially" refer to a direction extending along the perimeter of the surface of the tread perpendicular to the axial direction.

"Radial" and "radially" refer to a direction perpendicular to the axis of rotation of a tire.

"Tread" as used herein, refers to that portion of the tire that comes into contact with the road or ground under normal inflation and normal load.

"Packing density" as used herein, refers to a ratio of the volume occupied by the filaments to the total volume of the filament assembly.

While similar terms used in the following descriptions describe common tire components, it should be understood that because the terms carry slightly different connotations, one of ordinary skill in the art would not consider any one of the following terms to be purely interchangeable with another term used to describe a common tire component.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the side of the tire. Thus, when relative directional terms such as "inner" and "outer" are used in connection with an element, the "inner" element is spaced closer to the equatorial plane of the tire than the "outer" element.

Figure 1:
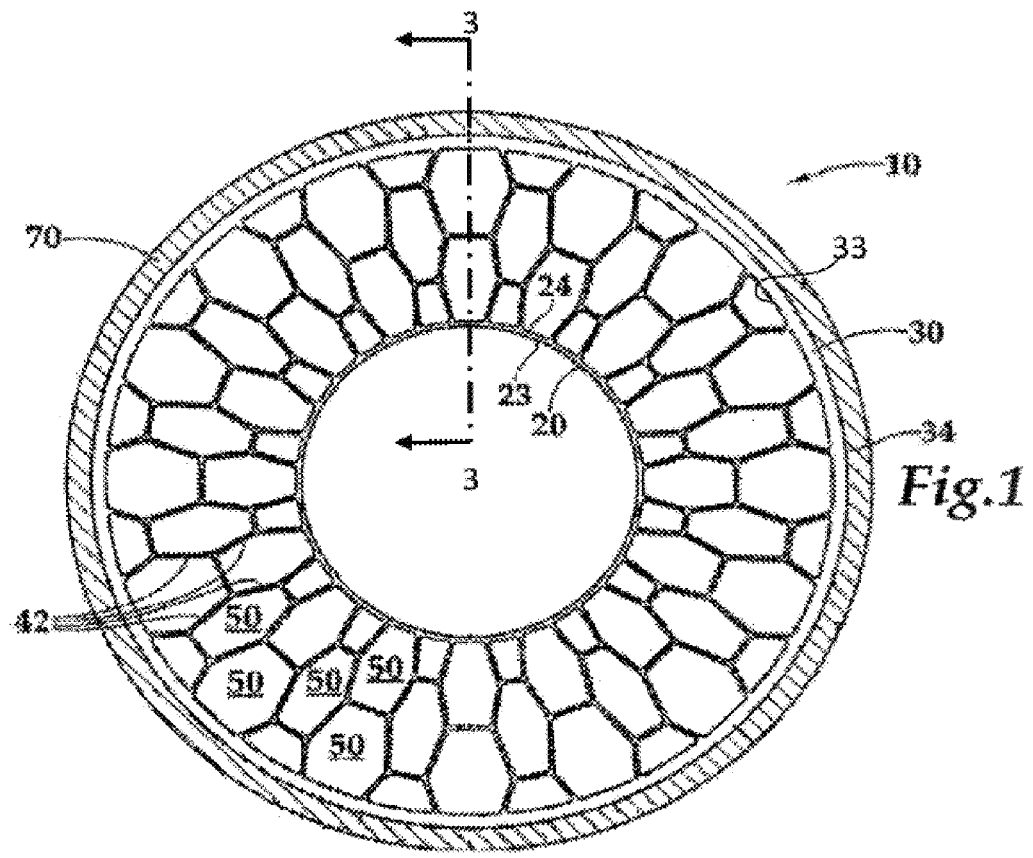
FIG. 1 is a side view of one embodiment of an undeformed non-pneumatic tire.
Figure 2:
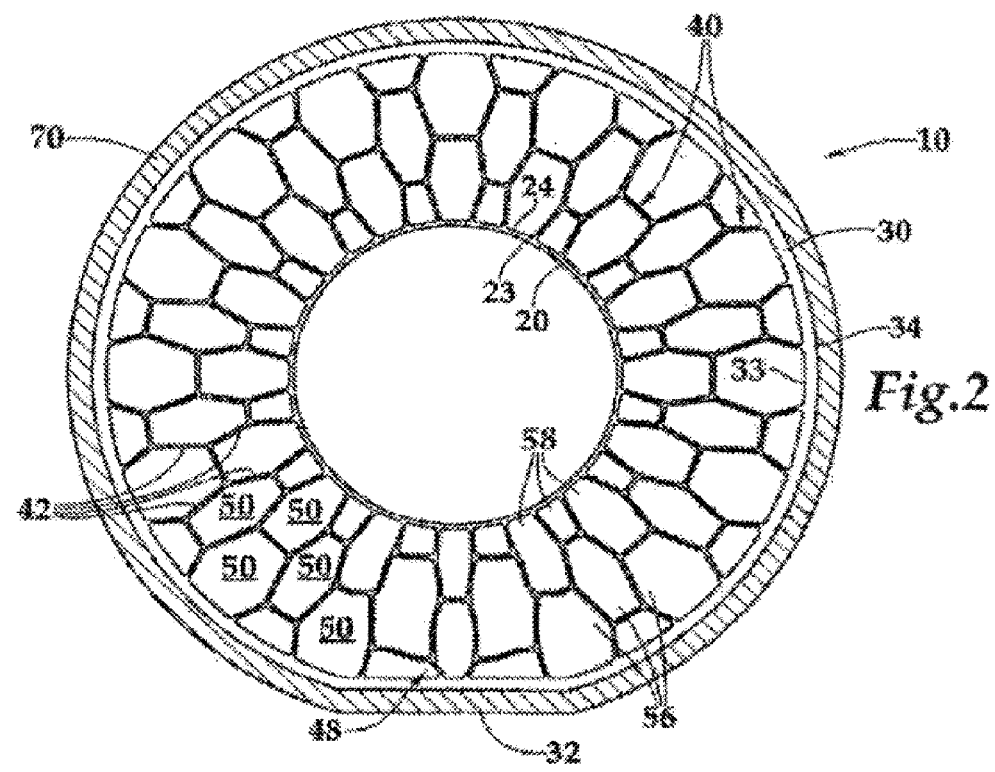
FIG. 2 is a side view of the non-pneumatic tire of FIG. 1 being deformed when subjected to a load.
Figure 3:
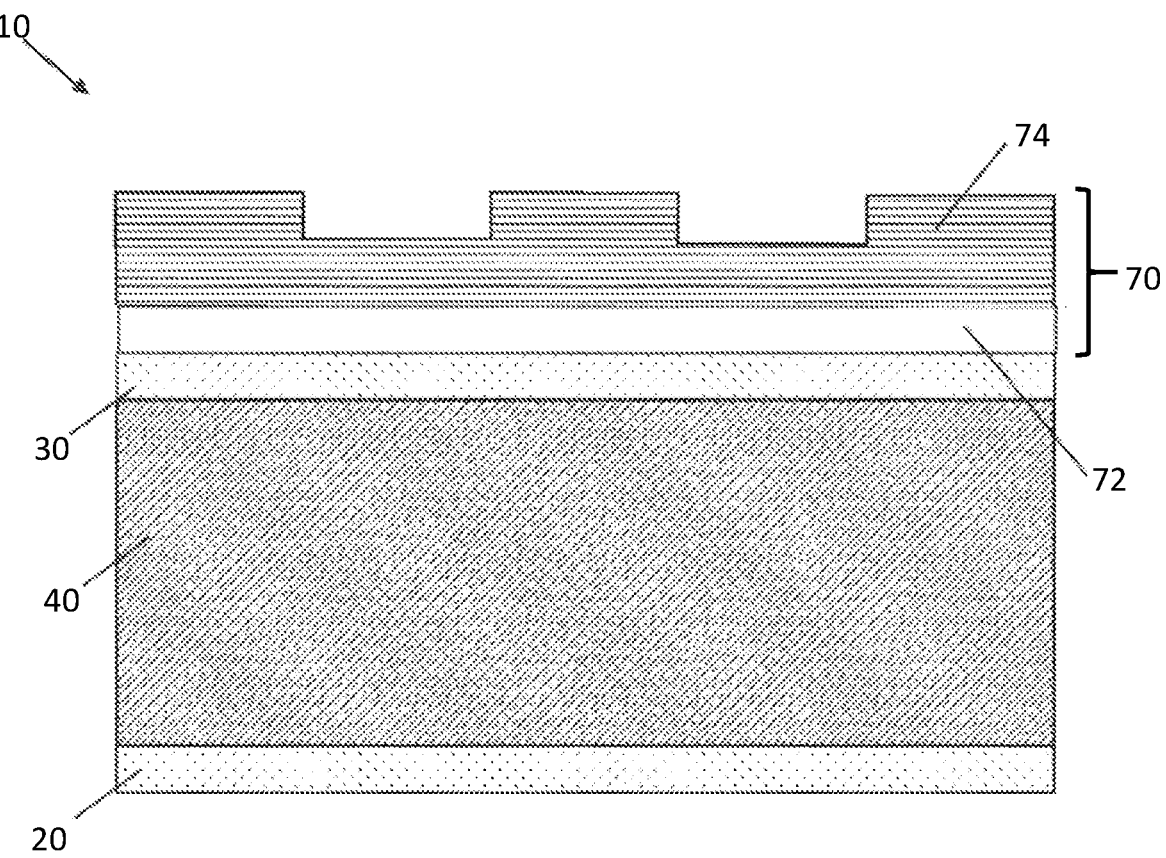
FIG. 3 is a schematic drawing illustrating a partial cross-section along line 3-3 of the non-pneumatic tire shown in FIG. 1.

FIGS. 1-3 illustrate one embodiment of a non-pneumatic tire 10. The non-pneumatic tire 10 is merely an exemplary illustration and is not intended to be limiting. In the illustrated embodiment, the non-pneumatic tire 10 includes a generally annular lower ring 20. The lower ring 20 may engage a vehicle hub (not shown) for attaching the tire 10 to a vehicle. The lower ring 20 has an internal surface 23 and an external surface 24, and may be made of a polymeric material, an elastomeric material, metal, or any other desired material.

The non-pneumatic tire 10 further includes a generally annular upper ring 30 that is disposed above the lower ring 20. The upper ring 30 has a diameter that is greater than a diameter of the lower ring 20, and is substantially coaxial with the lower ring 20. The upper ring 30 has an internal surface 33 and an external surface 34, and may be made out of a polymeric material, an elastomeric material, metal, or any other desired material. A circumferential tread 70 is attached to the external surface 34 of the upper ring 30. The circumferential tread 70 may be attached to the upper ring 30 adhesively or by using other methods known in the art. As shown in FIG. 2, the upper ring 30 may be configured to deform in an area 48 around and including a footprint region 32, which may decrease vibration and increase ride comfort.

Support structure 40 connects the lower ring 20 to the upper ring 30. The support structure 40 extends from the external surface 24 of the lower ring 20 and the internal surface 33 of the upper ring 30. In the illustrated embodiment, the support structure 40 is webbing. The illustrated webbing 40 has at least two radially adjacent layers 56, 58 of web elements 42 that define a plurality of generally polygonal openings 50. In alternative embodiments, the support structure may be spokes or any other desired arrangement. In alternative embodiments that employ webbing, other web configurations may be provided. For example, the webbing may include a fewer or greater number of radially adjacent layers. As another example, the web elements may form openings of any desired shape.

As shown in FIG. 3, the circumferential tread 70 includes a tread band 72 and a tread layer 74. The tread layer 74 may be made out of rubber, and may include tread elements (not shown) such as grooves, ribs, blocks, lugs, sipes, studs, or any other desired elements. The tread band 72 may include a filament assembly.

In the illustrated embodiment, the tread band 72 is shown as a single layer. In an alternative embodiment (not shown), the tread band may be a multi-layer band. Such multi-layer tread bands may include one or more layers of substantially inextensible material. Such layers may be formed of a metal, such as steel. The substantially inextensible layers may be formed of a sheet of material or by cords or filaments of material. A multi-layer tread band may optionally include a layer of extensible material, such as an elastomer. For example, the tread band may include a pair of inextensible layers separated by a layer of extensible material. Tread bands may include bands that are referred to as shear bands, shear elements, or thin annular high strength band elements.

Figures 4, 5:
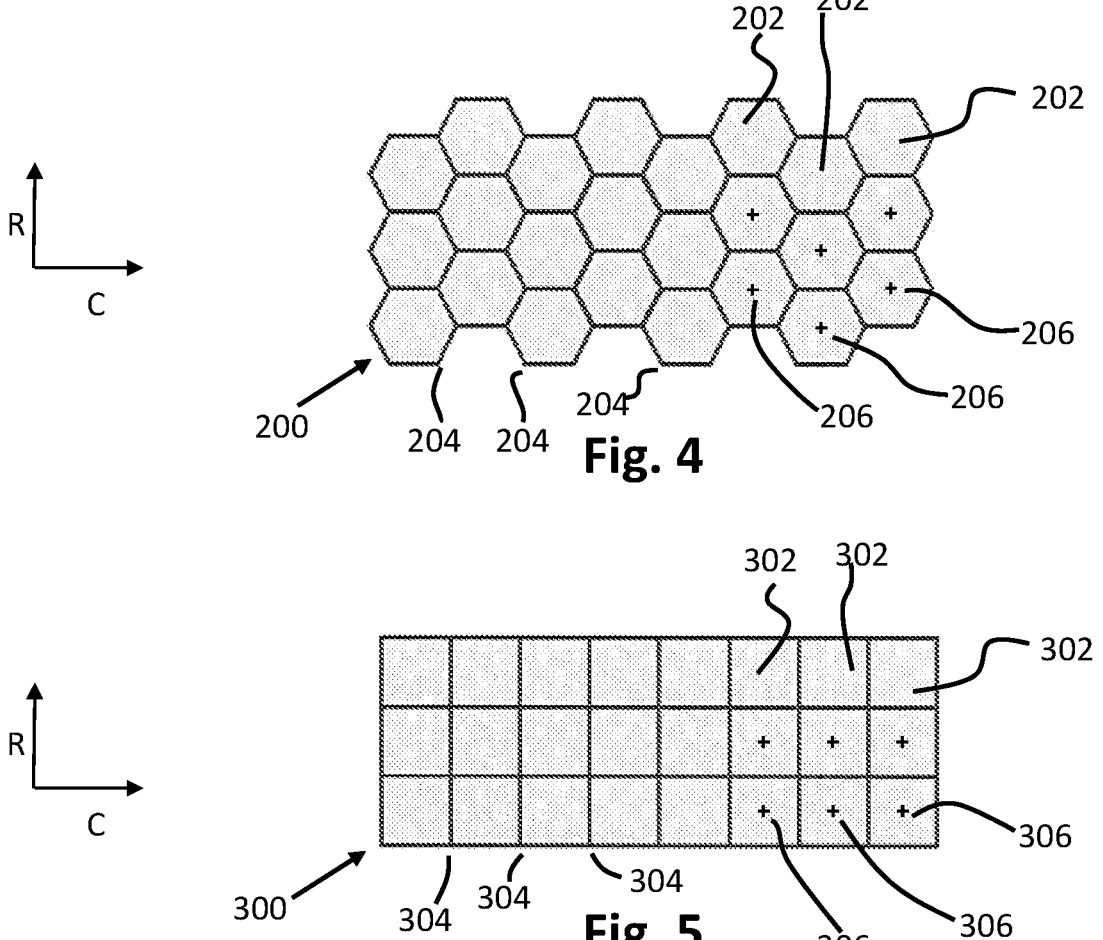
FIG. 4 is a close up of part of the non-pneumatic tire as shown in FIG. 3 according to one embodiment of a filament assembly.
FIG. 5 is a close up of part of the non-pneumatic tire as shown in FIG. 3 according to another embodiment of a filament assembly.

FIG. 4 shows a cross-section of part of an exemplary filament assembly 200. According to one embodiment, the filament assembly 200 makes up the entire tread band 72. In alternative embodiments, the tread band may include other elements besides the filament assembly.

The filament assembly 200 includes a plurality of individual filaments 202. Each of the individual filaments 202 themselves may be a single strand of material (i.e., monofilament) or may include multiple strands of material (i.e., multi-filament). The filaments 202 may be made out steel, fabric, or any other desired material. According to one embodiment, each filament may have a coating that is used to secure the individual filaments 202 together to form the filament assembly 200. In one embodiment, the coating has a thickness that is in the range of 0-10 mm. In an alternative embodiment, the thickness of the coating is in the range of 0-0.25 mm. In another alternative embodiment, the thickness of the coating is in the range of 0.025-0.25 mm. In one embodiment, the coating is rubber. In alternative embodiments, the coating may be polymers other than rubber, epoxy, or adhesives. In another alternative embodiment, the filaments may be free from a coating. In other alternative embodiments, the individual filaments may be secured together using mechanical fasteners or any other desired arrangement.

In the illustrated embodiment, each of the individual filaments 202 has a substantially hexagonal cross section. Corners 204 of each filament 202 are rounded to improve fatigue resistance of the filaments 202. In alternative embodiments, the corners may be provided as a sharp corner. In the illustrated embodiment, a central longitudinal axis 206 of each filament is aligned in the radial direction (R) and offset in the circumferential direction (C) relative to adjacent filaments. In alternative embodiments, the filaments may have any desired alignment. For example, the central longitudinal axis of each filament may be offset in the radial direction and aligned in the circumferential direction relative to adjacent filaments.

FIG. 5 shows a cross-section of part of another exemplary filament assembly 300. The filament assembly 300 of FIG. 5 is substantially similar to the filament assembly 200 of FIG. 4, except for the differences described herein.

The filament assembly 300 includes a plurality of individual filaments 302. Each of the individual filaments 302 has a substantially square cross section. Corners 304 of each filament 302 are rounded to improve fatigue resistance of the filaments 302. In alternative embodiments, the corners may be provided as a sharp corner. In the illustrated embodiment, a central longitudinal axis 306 of each filament is aligned in the radial direction (R) and also aligned in the circumferential direction (C) relative to adjacent filaments. In alternative embodiments, the filaments may have any desired alignment. For example, the central longitudinal axis of each filament may be offset in the radial direction and aligned in the circumferential direction relative to adjacent filaments. As yet another example, the central longitudinal axis of each filament may be aligned in the radial direction and offset in the circumferential direction relative to adjacent filaments.

In each of the above examples, a diameter of a circle circumscribing each of the filaments 202, 302 is, in one embodiment, in the range of 0.1-25 mm. In an alternative embodiment, the diameter is in the range of 0.35-25 mm. In another alternative embodiment, the diameter is in the range of 0.35-5 mm.

Due to the specific cross sectional shape of the individual filaments 202, 302 of the filament assemblies 200, 300 shown in FIGS. 4 and 5, respectively, it is possible to achieve a 100% packing density of the filaments. This is in comparison to tires having a tread band that is formed by a plurality of filaments having a circular cross section, which are only able to achieve approximately a 91% packing density. The increased packing density of the filament assemblies 200,300 of FIGS. 4 and 5 may minimize rolling resistance and heat generation, thereby improving performance and robustness of the non-pneumatic tire as compared to non-pneumatic tires that use filaments with a circular cross section to form the tread band.

The above discussed 100% packing density of the filaments may be achievable in filament assemblies that use mechanical fasteners to secure the individual filaments together or use filaments that are free from a coating. In filament assemblies that use a coating on each filament to secure the individual filaments together, a 100% packing density may not be possible due to the presence of the coating. In one example embodiment, the packing density of the filaments is at least 92%. In an alternative embodiment, the packing density is at least 93%. In another alternative embodiment, the packing density is at least 94%. In yet another alternative embodiment, the packing density is at least 95%. In still another alternative embodiment, the packing density is at least 96%. In yet another alternative embodiment, the packing density is at least 97%. In still another alternative embodiment, the packing density is at least 98%. In yet another alternative embodiment, the packing density is at least 99%.

The individual filaments may be formed using any desired process. One nonlimiting example of a process for forming the individual filaments may include passing steel cords having a substantially circular cross section through a die to impart a different geometry on the cord, such as a hexagonal or square cross section. In one embodiment, this process is performed without applying additional heat to the cord. In an alternative embodiment, a low amount of heat may be applied. Another nonlimiting example processes for forming the individual filaments may include swaging. Depending on the process used, it may be easier to form filaments with a hexagonal cross section as compared to filaments with a square cross section.

Figure 6:
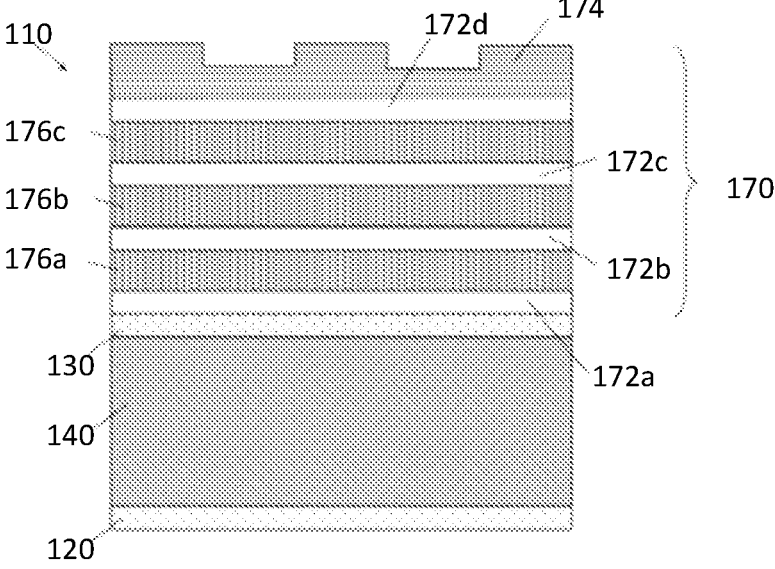
FIG. 6 is a schematic drawing illustrating a partial cross-section of another embodiment of a non-pneumatic tire.

FIG. 6 shows another example embodiment of a non-pneumatic tire 110. The non-pneumatic tire 110 of FIG. 6 is substantially similar to the non-pneumatic tire 10 of FIGS. 1-3, except for the differences described herein. Accordingly, like features will be identified by like numerals increased by a value of "100."

The non-pneumatic tire 110 includes a generally annular lower ring 120 and a generally annular upper ring 130. A circumferential tread 170 is attached to the upper ring 130. Support structure 140 connects the lower ring 120 to the upper ring 130.

The circumferential tread 170 includes a tread layer 174, and inextensible layers 172 and extensible layers 176 between the upper ring 130 and the tread layer 174. In the illustrated embodiment, the circumferential tread 170 includes three extensible layers 176a, 176b, 176c, that alternate between four inextensible layers 172a, 172b, 172c, 172d. The first inextensible layer 172a is attached to the upper ring 130 and the fourth inextensible layer 172d is attached to the tread layer 174. In alternative embodiments, any desired arrangement of extensible layers and inextensible layers may be provided. For example, the circumferential tread may include three inextensible layers that alternate between four extensible layers, with the first extensible layer being attached to the upper ring and the fourth extensible layer being attached to the tread layer. As another example, the circumferential tread may include a fewer or greater number of extensible layers or inextensible layers than what is shown in FIG. 6.

Each of the inextensible layers 172 of the non-pneumatic tire 110 of FIG. 6 may include a filament assembly 200 formed by a plurality of individual filaments 202 having a hexagonal cross section as shown in FIG. 4, or may include a include a filament assembly 300 formed by a plurality of individual filaments 302 having a square cross section as shown in FIG. 5. Additionally, the non-pneumatic tire 110 of FIG. 6 may include different inextensible layers that include filaments having different cross sections or different alignments. For example, the first and third inextensible layers may have filament assemblies formed by filaments having a hexagonal cross section, while the second and fourth inextensible layers may have filament assemblies formed by filaments having a square cross section. As another example, the first and third inextensible layers may have filament assemblies formed by filaments with central longitudinal axes that are aligned in the circumferential direction and offset in the radial direction relative to adjacent filaments, while the second and fourth inextensible layers may have filament assemblies formed by filaments with central longitudinal axes that are offset in the circumferential direction and aligned in the radial direction relative to adjacent filaments.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2*d*. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept. For example, while the tread band has been described with respect to non-pneumatic tires, the tread band may also be employed in pneumatic tires, such as run-flat pneumatic tires. As another example, while the tread band has been described as including a filament assembly that has individual filaments with a hexagonal or square cross section, the cross sectional shape of the filaments may be any regular geometric shape with straight sides. Nonlimiting examples of shapes for the cross section of each filament include triangular, pentagonal, heptagonal, or octagonal.

What is claimed is:

1. A non-pneumatic tire comprising:
a lower ring having a first diameter;
an upper ring having a second diameter greater than the first diameter, the upper ring being substantially coaxial with the lower ring;
support structure connecting the lower ring to the upper ring; and
a circumferential tread attached to the upper ring, the circumferential tread including a tread layer and a tread band, the tread band including a single filament assembly that includes a plurality of individual filaments having a non-circular cross section, the filaments being configured and arranged such that the filaments have a packing density of at least 92% within the single filament assembly, the packing density being a ratio of the volume occupied by the filaments to the total volume of the single filament assembly, the single filament assembly making up the entire tread band.

2. The non-pneumatic tire of claim 1, wherein each of the plurality of filaments has a square cross section.

3. The non-pneumatic tire of claim 1, wherein each of the plurality of filaments has a hexagonal cross section.

4. The non-pneumatic tire of claim 1, wherein each of the plurality of filaments has a central longitudinal axis, the central longitudinal axes of the filaments being aligned relative to adjacent filaments in one of a circumferential direction and a radial direction of the non-pneumatic tire and offset relative to adjacent filaments in one other of the circumferential direction and the radial direction of the non-pneumatic tire.

5. The non-pneumatic tire of claim 1, wherein each of the plurality of filaments has a central longitudinal axis, the central longitudinal axes of the filaments being aligned relative to adjacent filaments in both a circumferential direction and a radial direction of the non-pneumatic tire.

6. The non-pneumatic tire of claim 1, wherein corners of the individual filaments are rounded.

7. The non-pneumatic tire of claim 1, wherein the individual filaments are secured together using at least one of rubber, adhesive, epoxy, and mechanical fasteners.

8. The non-pneumatic tire of claim 1, wherein each of the individual filaments is formed from a cord that initially has a substantially circular cross section and is processed to give the filament the non-circular cross section.

9. A method of manufacturing a non-pneumatic tire comprising the steps of:
providing a lower ring having a first diameter and an upper ring having a second diameter that is greater than the first diameter;
connecting the lower ring to the upper ring with support structure;
forming a plurality of individual filaments having a non-circular cross section;
assembling the plurality of individual filaments into a single filament assembly that makes up the entire tread band, the single filament assembly having a packing density of at least 92%, the packing density being a ratio of the volume occupied by the filaments to the total volume of the single filament assembly;

applying a tread layer to the tread band to form a circumferential tread; and
attaching the circumferential tread to the upper ring.

10. The method of manufacturing a non-pneumatic tire of claim 9, further comprising the step of forming the individual filaments by processing a cord that initially has a substantially circular cross section to impart a non-circular cross section on the filament.

11. The method of manufacturing a non-pneumatic tire of claim 10, wherein the imparting of a non-circular cross section on the filament includes imparting a square cross section on the filament.

12. The method of manufacturing a non-pneumatic tire of claim 10, wherein the imparting of a non-circular cross section on the filament includes imparting a hexagonal cross section on the filament.

13. The method of manufacturing a non-pneumatic tire of claim 9, wherein each of the plurality of filaments has a central longitudinal axis, and wherein the method further comprises the step of aligning the central longitudinal axes of adjacent filaments in one of a circumferential direction and a radial direction of the non-pneumatic tire and offsetting the central longitudinal axes of adjacent filaments in one other of the circumferential direction and the radial direction of the non-pneumatic tire.

14. The method of manufacturing a non-pneumatic tire of claim 9, wherein each of the plurality of filaments has a central longitudinal axis, and wherein the method further comprises the step of aligning the central longitudinal axes of adjacent filaments in both a circumferential direction and a radial direction of the non-pneumatic tire.

15. The method of manufacturing a non-pneumatic tire of claim 9, further comprising the step of rounding corners of the individual filaments.

16. A non-pneumatic tire comprising:
a lower ring having a first diameter;
an upper ring having a second diameter greater than the first diameter, the upper ring being substantially coaxial with the lower ring;
support structure connecting the lower ring to the upper ring; and
a circumferential tread attached to the upper ring, the circumferential tread including a tread layer, at least one inextensible layer, and at least one extensible layer, the at least one inextensible layer and the at least one extensible layer being disposed between the tread layer and the upper ring along a radial direction of the non-pneumatic tire, the at least one inextensible layer including a single filament assembly that includes a plurality of individual filaments having a non-circular cross section, a circle circumscribing each of the filaments having a diameter of 0.1-25 mm, each of the filaments having a coating with a thickness of 0-10 mm;
wherein the filaments are configured and arranged such that the filaments have a packing density of at least 92% within the single filament assembly, the packing density being a ratio of the volume occupied by the filaments to the total volume of the single filament assembly, the single filament assembly making up the entire tread band.

17. The non-pneumatic tire of claim 16, wherein each of the plurality of filaments has one of a square cross section and a hexagonal cross section.

18. The non-pneumatic tire of claim 16, wherein each of the plurality of filaments has a central longitudinal axis, the central longitudinal axes of the filaments being aligned relative to adjacent filaments in one of a circumferential direction and a radial direction of the non-pneumatic tire and offset relative to adjacent filaments in one other of the circumferential direction and the radial direction of the non-pneumatic tire.

19. The non-pneumatic tire of claim 16, wherein each of the plurality of filaments has a central longitudinal axis, the central longitudinal axes of the filaments being aligned relative to adjacent filaments in both a circumferential direction and a radial direction of the non-pneumatic tire.

* * * * *